(12) United States Patent
Graber

(10) Patent No.: US 9,217,392 B2
(45) Date of Patent: Dec. 22, 2015

(54) VORTEX CANNON WITH ENHANCED RING VORTEX GENERATION

(76) Inventor: Curtis E. Graber, Woodburn, IN (US)

(*) Notice: Subject to any disclaimer, the term of this patent is extended or adjusted under 35 U.S.C. 154(b) by 1007 days.

(21) Appl. No.: 13/316,704

(22) Filed: Dec. 12, 2011

(65) Prior Publication Data

US 2013/0145746 A1 Jun. 13, 2013

(51) Int. Cl.
| F02K 7/02 | (2006.01) |
| F02K 9/97 | (2006.01) |
| F41H 13/00 | (2006.01) |
| A01G 13/08 | (2006.01) |

(52) U.S. Cl.
CPC . *F02K 7/02* (2013.01); *A01G 13/08* (2013.01); *F02K 9/97* (2013.01); *F41H 13/0043* (2013.01); *F05D 2260/16* (2013.01)

(58) Field of Classification Search
CPC .............. F02C 5/00; F02C 5/02; F02C 5/12; F02K 9/44; F02K 9/52; F02K 9/54; F02K 9/97; F02K 9/84; F02K 9/90; F23R 3/12; F23R 3/58; F23R 7/00; F23R 2900/00015
USPC ............. 60/247, 39.38, 39.76–39.81, 39.091; 431/1
See application file for complete search history.

(56) References Cited

U.S. PATENT DOCUMENTS

| 2,976,681 | A | * | 3/1961 | Pearson et al. ........... 239/265.29 |
| 3,064,753 | A |   | 11/1962 | McClure |
| 4,356,753 | A |   | 11/1982 | Galley |
| 4,642,611 | A |   | 2/1987 | Koerner |
| 5,067,316 | A | * | 11/1991 | Bonniot .......................... 60/263 |
| 5,428,951 | A | * | 7/1995 | Wilson et al. .................... 60/776 |
| 5,800,153 | A |   | 9/1998 | DeRoche |
| 5,864,517 | A |   | 1/1999 | Hinkey et al. |
| 5,937,635 | A | * | 8/1999 | Winfree et al. ............... 60/39.38 |
| 5,941,062 | A |   | 8/1999 | Koppel et al. |
| 5,973,999 | A |   | 10/1999 | Naff et al. |
| 6,250,065 | B1 | * | 6/2001 | Mandai et al. .................. 60/776 |
| 6,359,835 | B1 |   | 3/2002 | Gayl |
| 6,408,614 | B1 |   | 6/2002 | Eizenhöfer |
| 7,614,211 | B2 |   | 11/2009 | Chapin et al. |
| 7,669,406 | B2 |   | 3/2010 | Tangirala et al. |
| 7,784,287 | B2 |   | 8/2010 | Badding et al. |
| 7,882,926 | B2 |   | 2/2011 | Fullerton |

(Continued)

OTHER PUBLICATIONS

Lam, Matthew, et al., Pulse Detonation Engine Technology: An Overview, the University of British Columbia, Nov. 26, 2004 (Canada).

(Continued)

*Primary Examiner* — Andrew Nguyen
(74) *Attorney, Agent, or Firm* — Taylor IP, P.C.

(57) ABSTRACT

A vortex cannon based on pulse detonation engine comprises a combustion chamber, a fuel source, an oxidizer source, a purge gas source, a valve allowing delivery of fuel from the fuel source to the combustion chamber, a valve allowing deliver of either oxidizer or purge gas from the oxidizer and purge gas sources to the combustion chamber, an ignition source for the combustion chamber for initiating detonation of fuel and oxidizer, and a conical barrel outlet from the combustion chamber. The combustion chamber is configured for control over the detonation front. A control system provides for varying the rate and quantity of fuel and oxidizer injected to the combustion chamber for varying the frequency and strength of pulse generation. Ring vortices may be generated either in single pulses or at high rates of fire which maintain a consistent track.

14 Claims, 12 Drawing Sheets

(56) References Cited

U.S. PATENT DOCUMENTS

| | | |
|---|---|---|
| 2003/0029161 A1* | 2/2003 | Hunter, Jr. ............... 60/211 |
| 2005/0130084 A1* | 6/2005 | Aarnio et al. ............. 431/1 |
| 2006/0260291 A1 | 11/2006 | Vandervort et al. |
| 2009/0204306 A1* | 8/2009 | Goeke et al. ............. 701/100 |
| 2009/0320446 A1 | 12/2009 | Gutmark et al. |
| 2010/0275404 A1* | 11/2010 | Myers et al. ............. 15/316.1 |
| 2011/0005420 A1 | 1/2011 | Fullerton |

OTHER PUBLICATIONS

Wieringa, Jon, et al., If cannons cannot fight hail, what else?, Meteorlogische Zeitschrift, 15, issue 3, Jun. 2006, Stuttgart, Germany.

Newton System International LLC., How Hail Supression Systems Work?, web page, 2008, Kingsburg, California.

* cited by examiner

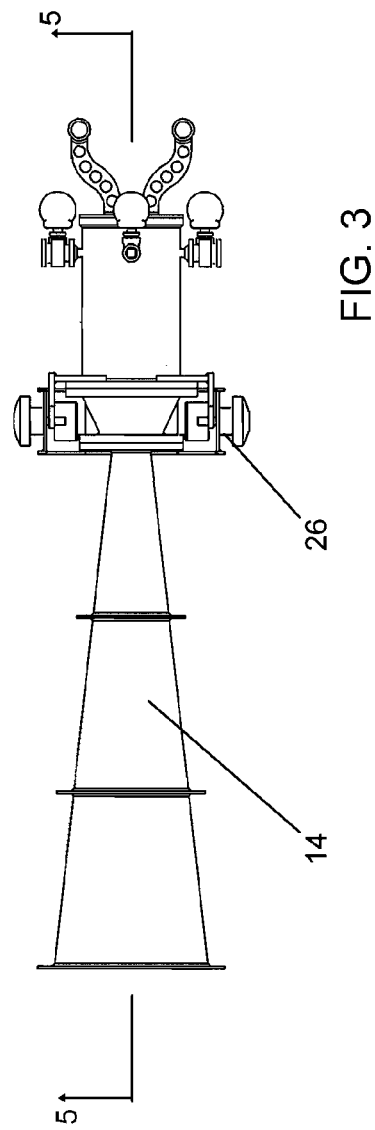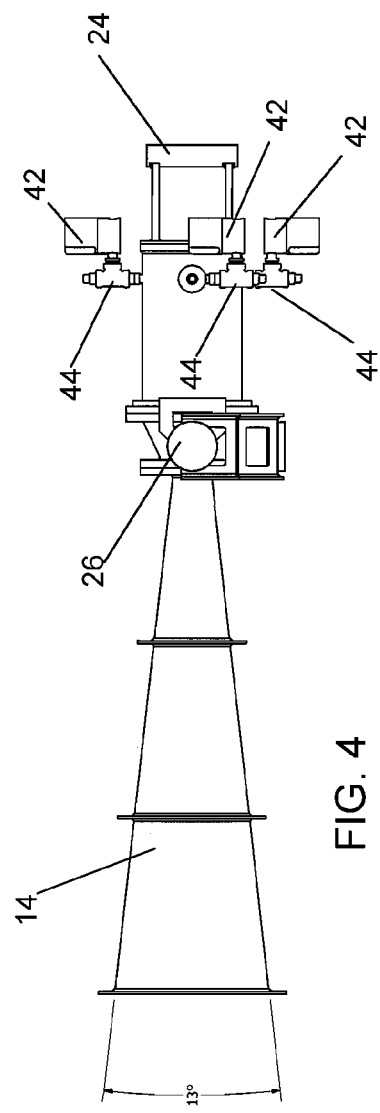
FIG. 3
FIG. 4

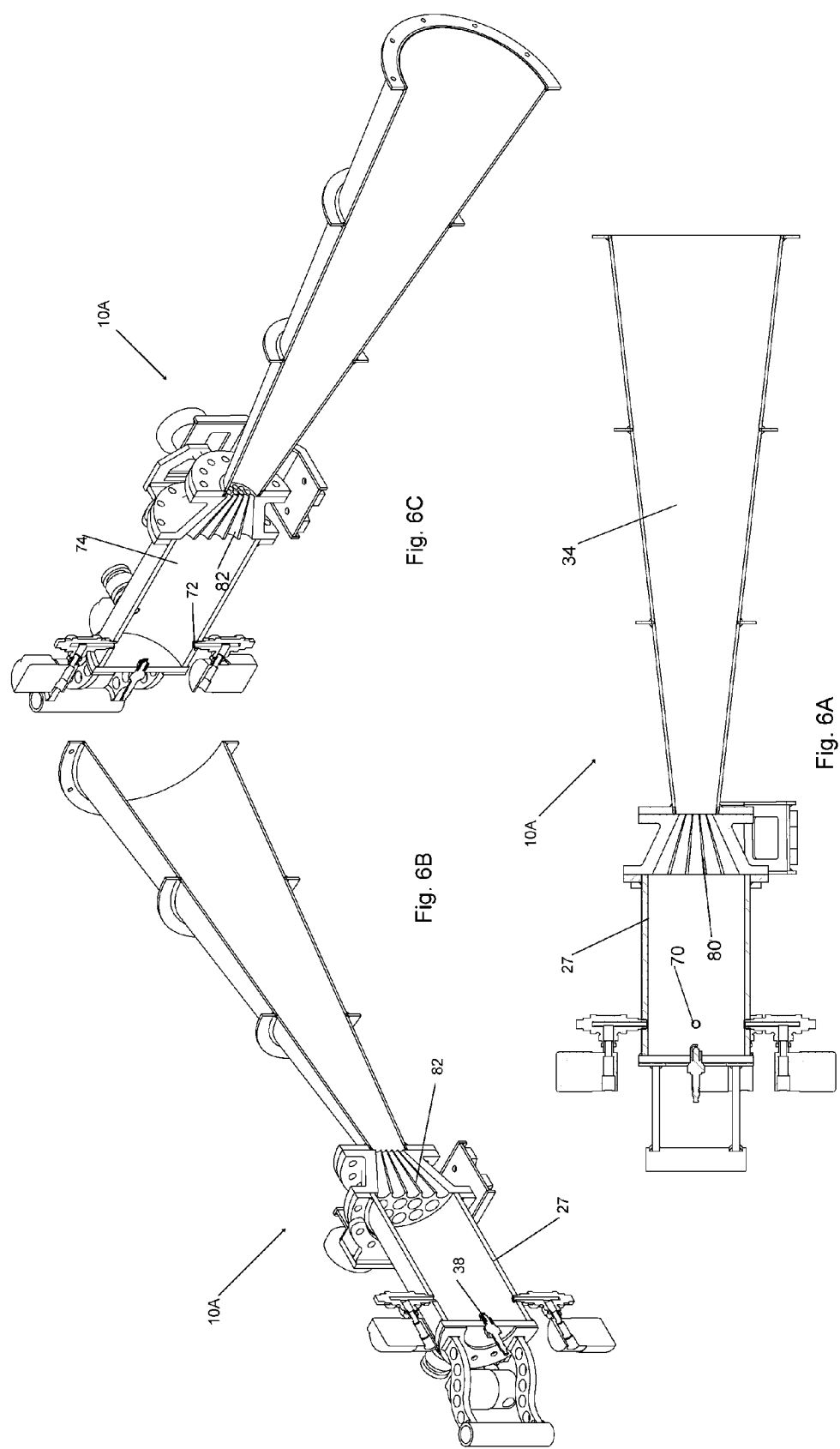

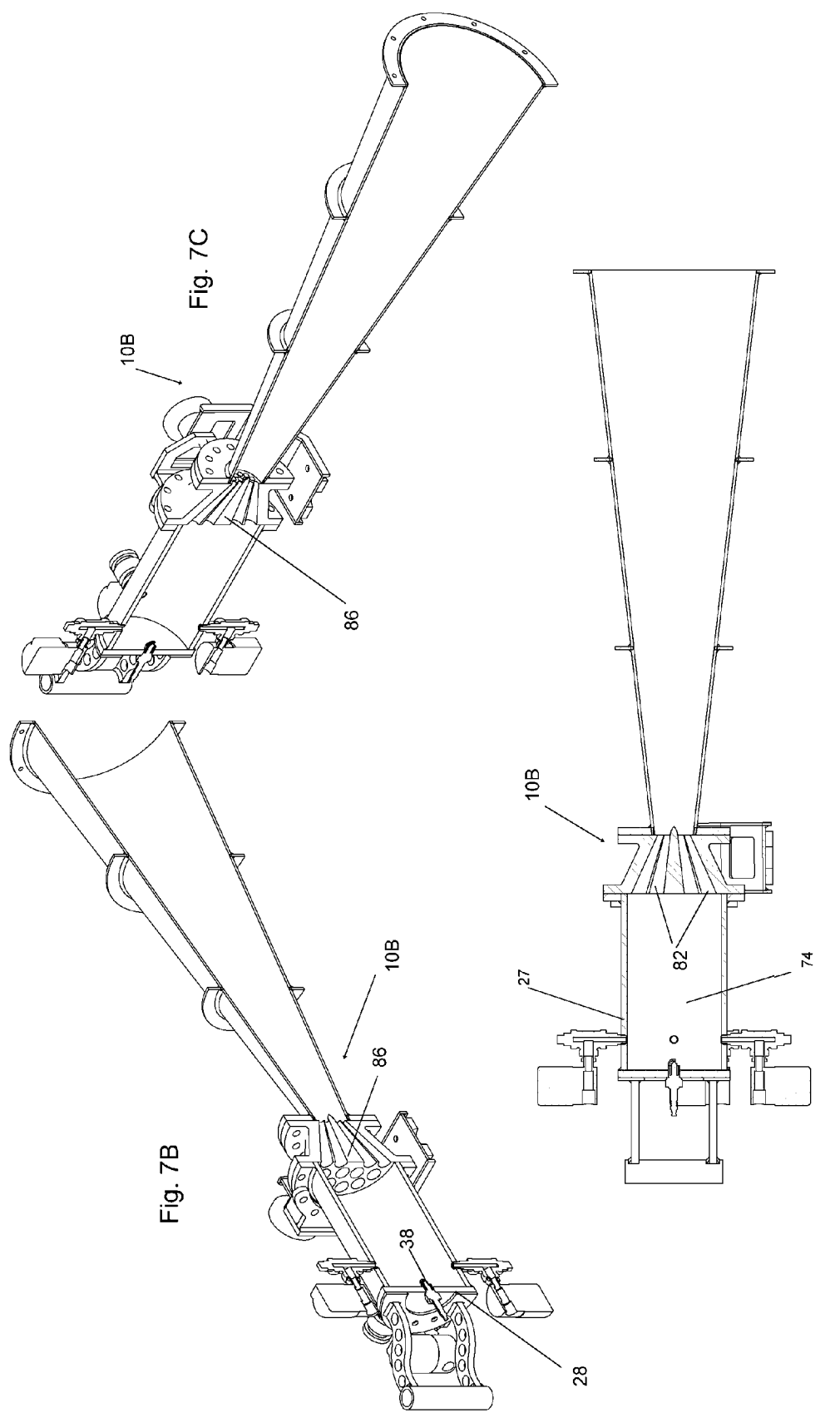

VORTEX CANNON WITH ENHANCED RING VORTEX GENERATION

BACKGROUND

1. Technical Field

The field relates to vortex cannons and more particularly to vortex cannons employing pulse detonation engines.

2. Description of the Problem

Pulse detonation engines have attracted recent research interest as potential sources of thrust for aerial vehicles among other applications. The interest in pulse detonation engines has been driven by the potential gains in thermodynamic efficiency from detonation as opposed to combustion of fuel and oxidizer. The chief factor underlying these potential efficiency gains is that the detonations generate a supersonic pressure wave front instead of the subsonic expansion associated with deflagration reactions supported by airbreathing gas turbine engines. The flame front in pulse detonation engines can propagate at speeds between 2,000 and 4,000 meters per second, well in excess of the speed of sound in the atmosphere. Application of pulse detonation engines to propulsion systems has been constrained by the inadequacy of conventional materials to handle the high heat and pressure levels generated by high frequency detonation cycling.

One characteristic of pulse detonation engines is that they produce a high level of noise. For a source of thrust this can be a disadvantage, at least where the vehicle is intended to operate in the atmosphere. But it led to recognition of the possible application of pulse detonation engines as sources of acoustic energy as described in U.S. Pat. No. 3,064,753. Galley, in U.S. Pat. No. 4,356,753, expanded on the teachings of the '753 patent. Galley adapted a "rocket engine type combustion chamber" to achieve sound "similar to that of a pipe organ and resonator." In Galley's musical instrument a fuel/oxygen mix was admitted to a combustion chamber for ignition by a spark plug. The sound resulting from ignition of this mixture was described as "explosive." Galley appears to have contemplated having the spark frequency, which was controllable, correspond to the intended frequency of the output sound. Galley did not specify a fuel type nor make explicit whether the character of the combustion process was deflagration or detonation though detonation seems likelier. The high operational frequencies asserted for the device, up to 2000 Hz., are high compared to pulse detonation engines when adapted for the generation of sufficient pressure to provide effective thrust for vehicle. Thrust generating pulse detonation engines seem generally to have been limited to about 25 Hz. The Galley device was strictly an acoustic application.

Pulse detonation engines have also found application in so called "hail" cannons which are a type of vortex cannon. Wiering a and Holleman, writing in the *Meteorologische Zeitschrift*, 15, issue 3, June 2006, noted that hail cannons were initially developed by Albert Stiger in 1896. Early hail cannons used a gunpowder charge while contemporary hail cannons use an acetylene/air mix in a combustion chamber. The pulse generated by detonation of the mix is directed through a compression throat into a conical barrel to generate a ring vortex at the muzzle. Effects of the ring vortex may be seen in a characteristic "smoke ring" which is actually moisture condensed out from the atmosphere. A typical firing rate for these devices is about once every four seconds although some references indicate rates up to 1 Hz. While the effectiveness of these devices for preventing the formation of or destroying hail is largely discredited the devices can be used to produce a substantial ring vortex which can propagate up to 100 meters from the barrel muzzle. A demonstration of a modern hail cannon may be seen at <<http://www.youtube.com/watch?v=lyAyd4WnvhU>>.

Ring vortices are examples of circular fluid flow occurring in a ring or toroidal region. Put more technically, a ring vortex is fluid motion in a circle around a line where the line curves back on itself in a closed loop. Fluid speed in the vortex is inversely proportional to distance from the line. Where unconstrained a ring vortex formed in the atmosphere will travel along a path centered in the closed loop and perpendicular to the plane of the closed loop. The greater the internal speed of the fluid caught in a ring vortex the greater the duration, stability and propagation speed the ring vortex will exhibit. Fluid velocity in the ring vortices produced by hail cannons can be supersonic which explains why the formations propagate for up to or more than 100 meters. Assuming a calm atmosphere the path of travel of a ring vortex will be straighter the more the closed loop approaches a true circle and as the velocity profile through the vortex is more consistent for cross sections of the vortex anywhere along the curved line. A vortex cannon will "shoot straight" if the gas pulse produced in the cannon exits the muzzle of the cannon in a plane which is perpendicular to the center line of the cannon "barrel."

SUMMARY

A vortex cannon comprises a pulse detonation engine with a combustion chamber, a fuel source, an oxidizer source, a purge gas source, a valve allowing delivery of fuel from the fuel source to the combustion chamber, a valve allowing delivery of either oxidizer or purge gas from the oxidizer and purge gas sources to the combustion chamber, an ignition source for the combustion chamber for initiating detonation of fuel and oxidizer mixture, and a compression outlet from the combustion chamber. A conical pulse guide is connected by an open apex for communication with compression outlet from the combustion chamber. The conical pulse guide has a muzzle distal to the open apex. The compression outlet from the combustion chamber may be a compression throat and may include a compression plug positioned in the throat. The combustion chamber is configured to deliver a clean, even pressure front to the compression throat/plug. The compression throat/plug accelerates detonation byproducts at high pressure into the conical pulse guide. A compression plug particularly delivers pulses ejected from the combustion chamber into the conical pulse guide exhibiting a planar front which is orthogonal with respect to a center axis of the conical pulse guide. This arrangement stabilizes flow down the conical pulse guide to improve ring vortex formation at the muzzle thereby improving consistent straight line propagation from the muzzle. A shear flange may be affixed radially around the muzzle of the conical planar pulse guide to promote ring vortex formation. A control system provides for varying the rate and quantity of fuel and oxidizer injected to the combustion chamber and coordinating their injection to provide mixing before ignition. The control system further provides for varying the frequency and strength of pulse generation under operator direction. Purging of the system chamber may be provided by inserting a relatively inert gas through input ports for the oxidizer. Purge is used to clear fuel from its injection nozzle just prior to ignition. This allows for higher potential cycle rates because no fuel is left in the nozzle which, starved for oxidizer, would burn slowly relative to the detonation occurring in the combustion chamber.

BRIEF DESCRIPTION OF THE DRAWINGS

Understanding of the following description may be enhanced by reference to the accompanying drawings, wherein:

FIG. 3 is a bottom view of the pulse detonation engine and radial vortex generator of FIG. 1.

FIG. 4 is a side view of the pulse detonation engine and radial vortex generator of FIG. 1.

FIGS. 6A-C are sectional views of a vortex cannon incorporating a possible compression plug.

FIGS. 7A-C are sectional views of a vortex cannon incorporating an alternative compression plug.

DETAILED DESCRIPTION

Figure 1:
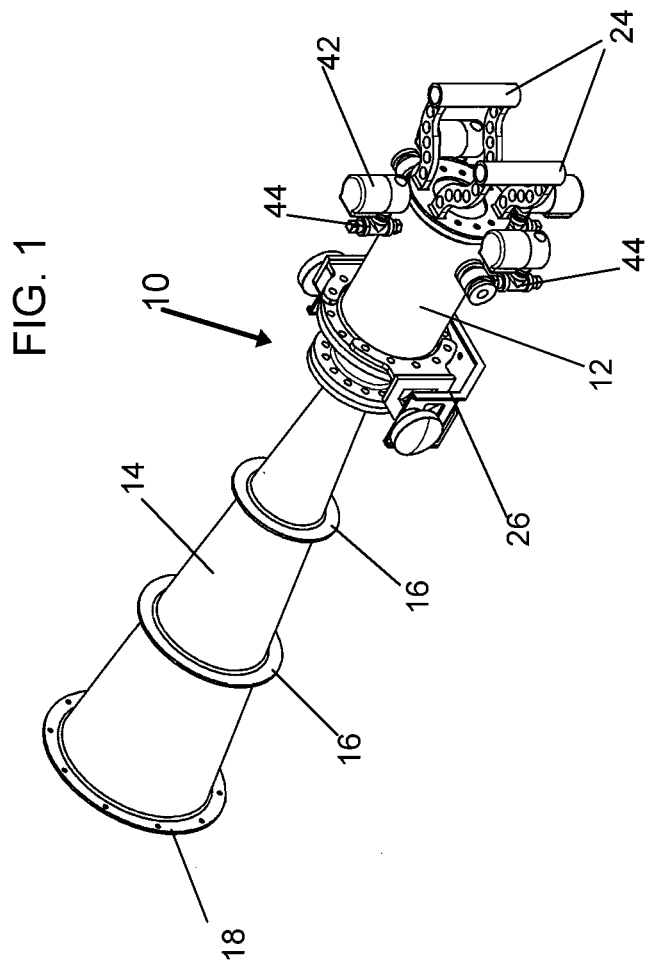
FIG. 1 is a perspective view of a pulse detonation engine and radial vortex generator with impulse and cycling control.
Figure 2:
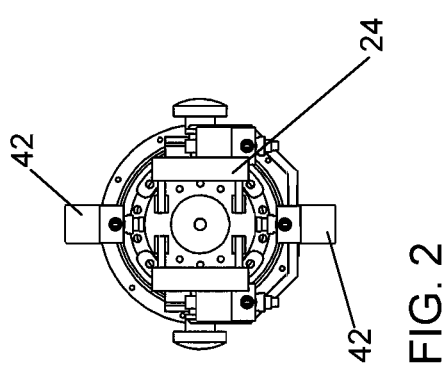
FIG. 2 is an end view of the pulse detonation engine and radial vortex generator of FIG. 1.

Referring to the figures and particularly to FIGS. 1-5 a vortex cannon 10 is shown. Vortex cannon 10 mates a pulse detonation engine 11 with a bell 14 to produce and project high velocity ring vortices, potentially at a high repeat rate of fire.

Bell 14 functions somewhat like the barrel of a gun, delivering expanding pulses of heated gas at high velocity to its muzzle 32 where the pulses or bursts impinge against ambient air to generate the ring vortices. Unlike a conventional gun barrel the channel defined by the interior face of bell 14 is shaped like a straight cone which has been truncated at both ends. This interior channel is referred to here as a conical pulse guide 32. Pulses travel through the conical pulse guide 32 in its direction of expansion resulting in acceleration of the pulses as they progress through the guide. Bell 14 is circumferentially reinforced at locations along its length by reinforcement rings 16, a radial shear former 18 located around a muzzle 34 and a mounting flange 13A mounted around an open apex 33 to the bell 14 distal to the muzzle 34. A second mounting flange 13B is installed on combustion chamber housing 12. Bell 14 is mounted to a combustion chamber housing 12 along a joint 20 formed between flanges 13A and 13B.

Located substantially adjacent joint 20 on combustion chamber housing 12 of pulse detonation engine 11 is a bracket mount 26 which includes a pivot axis allowing the vortex cannon 10 to pitch upward and downward for aiming. Mount 26 is readily positioned on a base which allows the vortex cannon 10 to be turned on a yaw axis perpendicular to the pitch axis. A full mount functions as a conventional alt-azimuth mount providing freedom of movement on the pitch and yaw axes and is not shown here.

Arranged radially around the exterior of the cylindrical combustion chamber housing 12 are metering valve housings 44. Associated with each metering valve housing 44 is a valve controller housing 42. Valve housings 44 can house any of the valves described herein and/or illustrated in the figures. Depending from a combustion chamber head 28 mounted on the cylindrical combustion chamber housing 12 at the opposite end of the vortex cannon 10 muzzle 34 are a pair of handles 24 which may be grasped by an operator to aim vortex cannon 10 when mounted in the same manner as a heavy infantry weapon is handled. A representative device is approximately one meter in length with a bell 14 section of approximately 61 cm. length.

Figure 5:
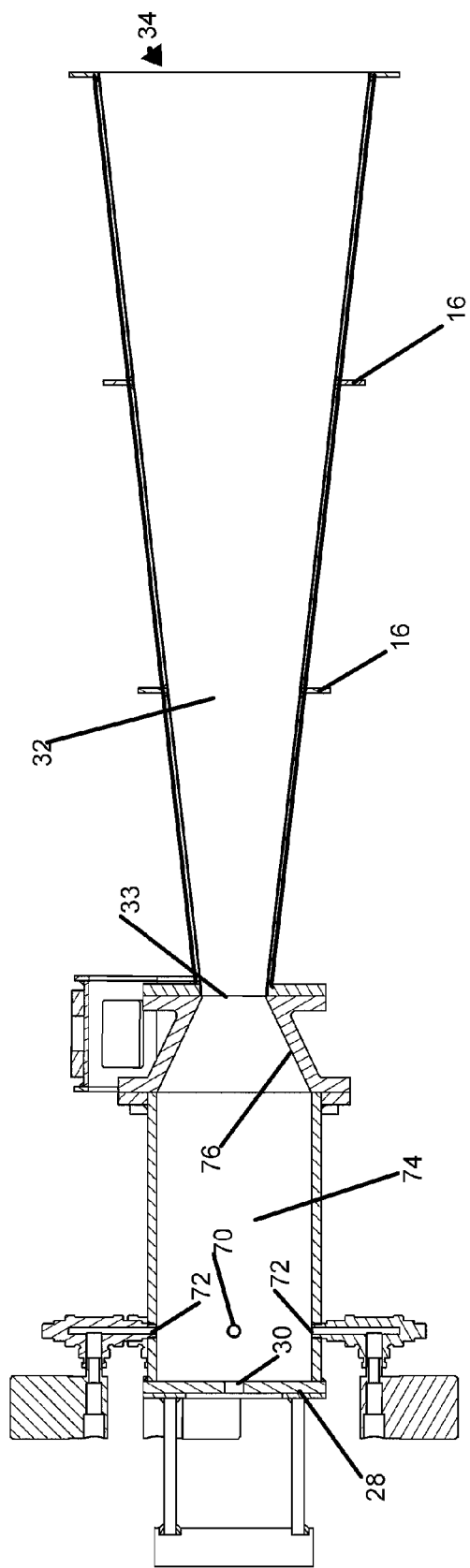
FIG. 5 is a cross sectional view of the pulse detonation engine and radial vortex generator of FIG. 1 taken along section lines 5-5 of FIG. 3.

Referring particularly to FIG. 5, a combustion chamber 74 is located within combustion chamber housing 12. In a typical embodiment the summed length of the combustion chamber 74 and compression throat 76 is about 0.3 meters. Combustion chamber 74 is cylindrical in cross section. Directed into combustion chamber 74, arranged radially through the cylindrical wall 27 of the combustion chamber 74 adjacent the combustion chamber head 28, are a plurality of inlet ports 70, 72 through which fuel, oxidizer and purge gas may be admitted to the combustion chamber. In the illustrated embodiment the inlet ports 70, 72 are located substantially proximate the combustion chamber head 28. Inlet ports 70, 72 may be angled or oriented to promote swirl mixing of fuel and oxidizer, or opposed inlet ports may point directly at one another to promote impingement mixing. Oxidizer and fuel are typically gasses liquids, particularly liquid fuels may be used. Inlet ports 70, 72 alternate around the circumference the cylindrical with inlet ports 70 being used to deliver fuel and inlet ports 72 being used to deliver oxidizer or a purge gas. Discharge from inlet ports 70, 72 is not continuous but pulsed. The oxidizer inlet ports 72 are purged after delivery of oxidizer by a purge gas which may be air or a chemically relatively inert gas such as nitrogen. Ignition is provided by an ignition source 30 located through the combustion chamber head 28 to promote initiation of the flame front along the combustion chamber head 28 and progression of the detonation front through the combustion chamber 74 in the direction of the compression throat 76.

An effective fuel/oxidizer combination is acetylene ($C_2H_2$) and oxygen ($O_2$), though other combinations are or may become possible. For example, middle distillates of oil have generally been regarded as supporting only deflagration reactions when mixed with air. However, it may be possible to increase injection pressure sufficiently to so atomize the material that a detonation reaction is supported, possibly in air but more probably in oxygen. Whatever combination is chosen the chemical combination of the materials should be highly exothermic and produce a supersonic flame front. For a stoichiometric mix of acetylene and oxygen, about 28.6% acetylene and 71.4% oxygen, the flame/detonation front propagates at about 2920 meters per second, which is about eight times the speed of sound in the atmosphere. In other words, the combination is explosive. The rapid pressure rise in the combustion chamber 74 should be monotonically nondecreasing and it should be even across the breadth of the opening to the compression throat 76.

The ignition source 30 is typically a spark plug, although alternative ignition sources may be considered such as a laser, a compression pulse outlet or some other spark source. A detonation event in the combustion chamber 74 initiated along and centered on (when a single ignition source is used) the combustion chamber head 28 results in a detonation front which should progress evenly toward the compression throat 76 and which increases pressure ahead of the front monotonically from the combustion chamber head 28 toward the compression throat 76. In addition, the detonation front should accelerate as it progresses, potentially resulting in compression ignition of the mixture and end velocities which are hypersonic. The high speed of the detonation front contributes to achieving the maximum over pressure in the combustion chamber 74 and increases compression contributing to gains in thermal efficiency. Should multiple ignition sources be used it is expected that they will be distributed on the compression chamber head 28 and exhibit symmetry about the center point of the head.

Combustion chamber 74 communicates with conical pulse guide 32 to allow for exhaust of detonation generated pulses of gas through the conical pulse guide 34 at high, potentially hypersonic velocities through a compression throat 76 or a compression plug as described in reference to FIG. 7A-B or 8A-B. The compression throat 76 operates best with an area ratio of between 2:1 to 6:1. Apex or throat 33 of pulse guide 32 is connected to a compression throat 76 which forms the outlet from combustion chamber 74 to conical pulse guide 34. The length of conical pulse guide 34 and the frequency of detonation events in combustion chamber 74 are related if the vortex cannon 10 is to function properly. This enhances the resulting muzzle generated ring vortices which may exhibit internal supersonic fluid flow. The higher the speed of the pulse the more quickly it passes through the conical pulse guide 34 for discharge from the muzzle 34 into collision with the outside air. A shock wave report is also produces which propagates from the muzzle 34 at the speed of sound.

Peak volume velocity of the system is determined at the point where the conversion efficiency of radial vortex spin decreases with an increase of detonation energy resulting in separation of the shock wave from the inner walls of the pulse guide 32. This is corrected by either decreasing detonation energy output or reducing the pulse guide 32 divergence angle.

The overall acoustic path of a vortex cannon 10 may be resonant tuned as determined by the energy pulse length to improve acoustic efficiency. This is calculated by the depth of the active filled combustion chamber 74 (the total burn time of the fuel/oxygen mix). If a pulse length is assumed to be the first quarter wavelength of the system an ideal acoustic path of four times the pulse length produces the highest acoustic efficiency in the system. As an example, where the combustion chamber 74 is taken to be one fourth of the total system acoustic path length a vortex cannon 10 may be constructed with a combustion chamber 74 having a length of 8.5", a compression phase plug of 2.5" in length and a conical pulse guide of 24" in length. This provides an overall acoustic path length of 34" with a wavelength equivalent of approximately 400 hz (1100 ft/sec/400 hz=2.75 ft or 33") and generated harmonics including 1200 hz ($3^{rd}$ order) and 2000 hz ($5^{th}$ order). Operating the system of repeat fire cycles of 50 hz, 100 hz, 200 hz or 400 hz produces increased output efficiency due to the resonance function of the acoustic path through the device. Non-optimum systems are also possible with unique tunings to accentuate specific frequencies.

In practice attempts to introduce more than one pulse passing through the conical pulse guide 34 destabilizes flow through the conical pulse guide 34. Thus multiple concurrent pulses are not allowed in the pulse guide. The detonation rate is increasingly limited by increasing the length of the conical pulse guide 34 for a given combination and mixture ratio of fuels and oxidizers. Shortening the conical pulse guide 34 allows an increased firing rate, but this in turn requires a more strongly angle of divergence of the conical pulse guide 34 in order to maintain maximum gain in fluid velocity. Where a divergence angle of 6 to 12 degrees is maintained the minimal length of bell 14 is optimally about 4 times the length of the combustion chamber 74 for stoichiometric mixes of acetylene and oxygen. This relationship can change for other fuels or oxidizers, non-stoichiometric ratios of fuel and oxidizer and potentially for the compression achieved in the compression throat as gas temperature in the combustion chamber 74 and acceleration achieved in the compression throat 76 will change relative acceleration of pulses through the compression throat 74 and the conical pulse guide 32.

It is possible that the burn rate is somewhat non-linear through the combustion chamber 74 due to the increased pressure on unburnt oxidizer/fuel mix ahead of the flame front moving from the spark source through the compression chamber 74 toward the compression throat 76 or compression plug 80. In this case the opportunity to increase the detonation repetition rate of any fuel/oxidizer beyond the rate expected at atmospheric pressure.

Opposite sides of bell 14 are shown diverging from one another at 13 degrees. The interior wall of bell 14 defines a conical pulse guide 32 opposite sides of which diverge at this same angle. Conical pulse guide 32 is circular in cross section and diverging, expanding in diameter from its apex 33 to a muzzle 34. The angle of divergence of conical pulse guide 34 is chosen to prevent detonation pulses passing through the pulse guide from open apex 33 to muzzle 34 from separating from the interior wall of bell 14 and extracting heat from the pulse to support further acceleration of the pulse as it expands through the guide toward the muzzle 34. Every boost to speed of pulse reinforces ring vortex formation at the muzzle 34. Optimum ring vortex formation seems to result from divergences of 4 to 12 degrees of the conical pulse guide. Angles larger than 18 to 20 degrees can result in separation of the pulse from the interior wall of the bell 14. In addition, increasing angles of divergence also mean that gas traveling along interior surface of bell 14 has increasingly longer distances to travel to the muzzle 34 compared to gas moving down the centerline of the guide. This can result in a pulse exhibiting an increasingly large bulge in the middle relative to its outer portions and thus becoming less planar. Angles of less than 4 degrees cost velocity gains in the pulse which can also inhibit ring vortex formation from the muzzle 34. Other forms than conical might be chosen for bell 14, such as a parabolic form where the cross sectional area of the pulse guide expands linearly with length.

In order to generate repeated ring vortices which track a consistent straight line path projected from vortex cannon 10 it is helpful if pulses of heated gas be introduced to the open apex 33 of conical pulse guide 32 in an even, "planar" pressure front. Doing so contributes to the pulse expanding evenly through the conical pulse guide 32 to the muzzle 34, with all sections of the leading front of the pulse hitting the ambient atmosphere at the same moment. This in turn produces a ring vortex at the muzzle 34 which is more nearly circular. Where the muzzle 34 is shaped other than as a circle in a plane orthogonal to the center line of the conical pulse guide 32 the ring vortices will follow a consistent track determined by the shape and orientation of the muzzle 34.

Configuration of the combustion chamber 74 to produce a even pressure rise across the breadth of the opening to the compression throat 76 contributes to generation of a nearly circular ring vortex by supporting delivery of an even pulse to the open apex 33 of the conical pulse guide 34. FIGS. 7A-C and 8A-C illustrate incorporation of possible compression plugs 80 and 86 in the zone of the compression throat 74, or in substitution for the compression throat 74, which can contribute to "leveling" of a planar pressure front for pulses in conical wave guide 32 of vortex cannons 10A-B. Compression plugs 80, 86 are located across the open end of combustion chambers 74 of vortex cannons 10A and 10B opposite the combustion chamber heads 28 from which a detonation front is initiated by a spark plug 52 installed through the combustion chamber heads. The compression plugs 80, 86 include a plurality of constrictive channels 82 which permit fluidic communication from the combustion chambers 74 to the conical pulse guides 32. Channels 82 are termed "constrictive" in that they progressively decrease in cross sectional area from the ends of the plugs 80, 86 facing the combustion chambers 74 to the face of the plugs on the open apex 33 of the conical pulse guides 34. Channels 82 divide the cross-sectional area of a compression throat 74 and converge onto the open apex 33 to linearize flow in a directional sense and thereby eliminate turbulence in the flow.

The chief difference between compression plug 80 and compression plug 86 is that no constriction channels 82 are provided along the longitudinal centerline of compression plug 86 in contrast to compression plug 80 where such channels are present. Where plugs 80, 86 are shaped as truncated cones to fit into a compression throat 74 the channels 82 converge on the longitudinal center line of the plugs from combustion chamber 74 toward the open apex 33. As a consequence, the length of channels 82 furthest removed from the longitudinal centerline is slightly greater than those closer to the center line and gas moving at the same speed through the channels takes longer to traverse the longer channels. This can contribute to a bulge in the pressure front of a pulse in the conical pulse guide 34. By eliminating the channels 68 closest to the longitudinal center line the maximum timing difference between radially "inner" channels and "outer" channels is reduced in order to reduce the degree of the possible bulge.

Figure 8A:
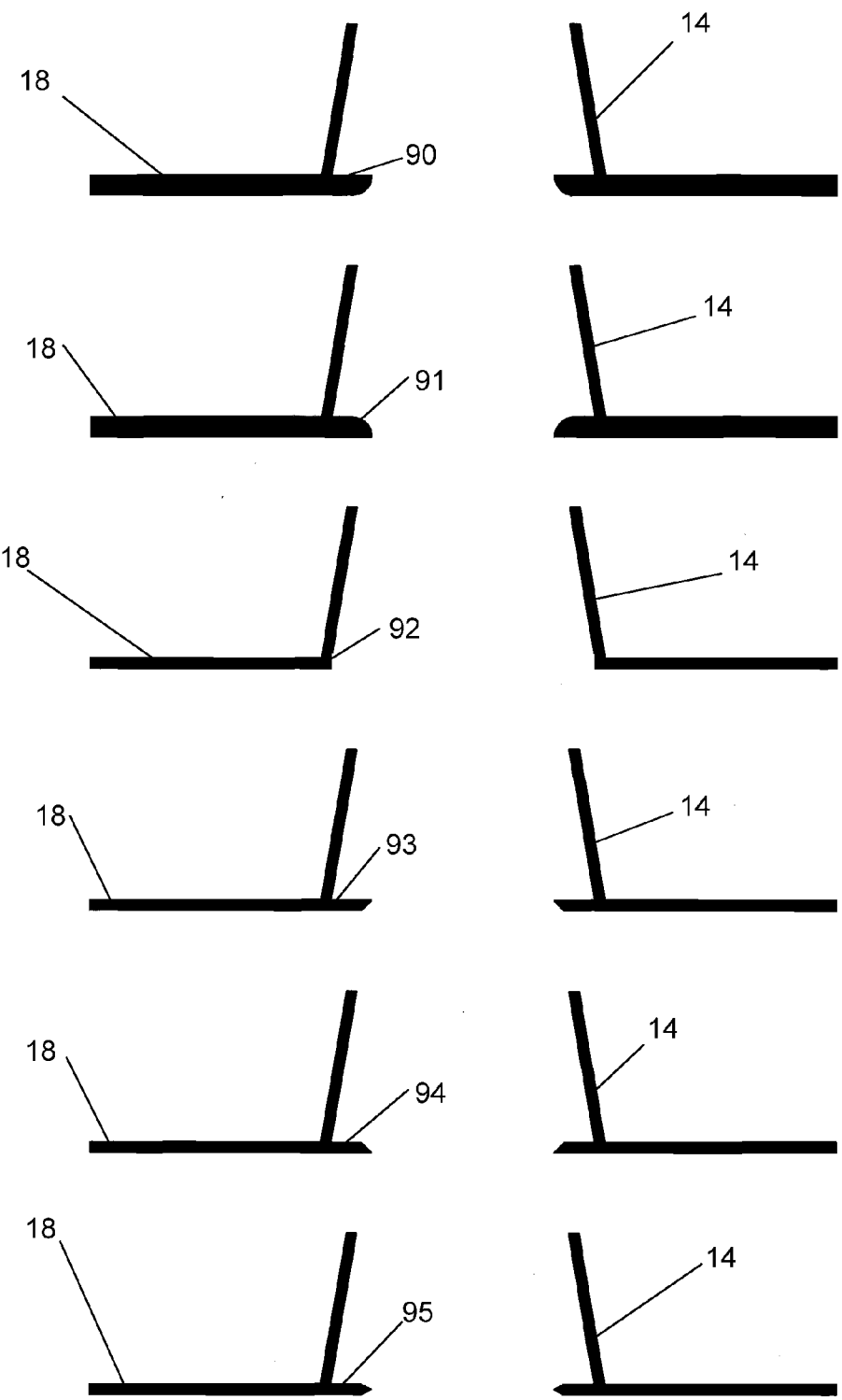
FIGS. 8A and 8B are cross sectional views of muzzle vortex generators.
Figure 8B:
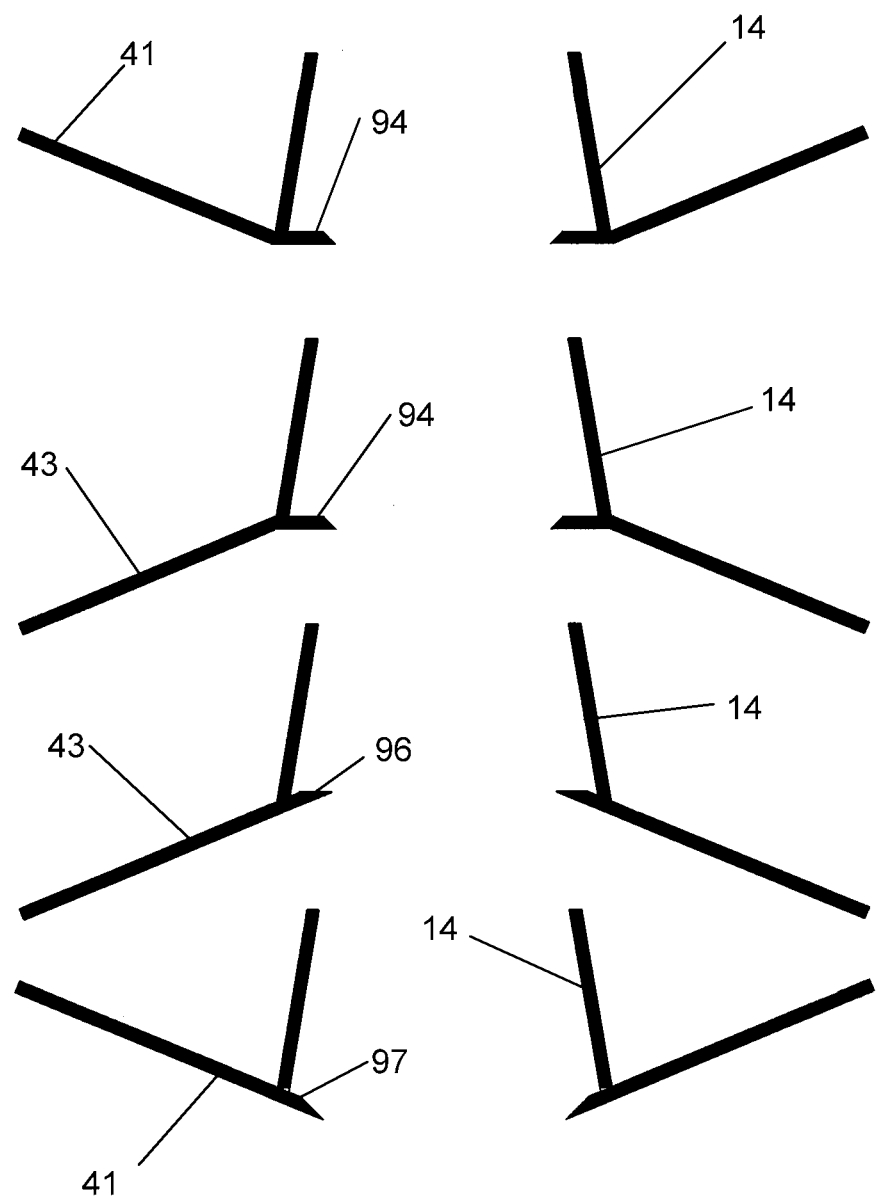

The muzzle 34 of bell 14 may terminate in circumferential radial shear former 18. FIGS. 8A and 8B illustrate possible cross-sectional aspects that the radial shear formers 18 may take. Examples include partial closures 90, 91, 93, 94, 95 and 96 which extend partly across the muzzle 34 which may promote swirling and an embodiment 92 where the muzzle 34 is left completely open. At the time this is being written it is unknown if partial closure of muzzle 34 will provide any benefit in promotion of ring vortex generation from a super or hypersonic pulse. Most versions of the radial shear former 18 include a straight flange 40 extending radially outwardly from the muzzle 34. However, in embodiments 41 and 43 the flange angles back away from the muzzle 34 and forward with the muzzle 34, respectively. Partial closures 90 and 91 are rounded at the end. Partial closures 93 and 94 are angled. Partial closure 95 comes to a point. Partial closures 95 and 96 angle into and out of the muzzle 34.

Figure 9:
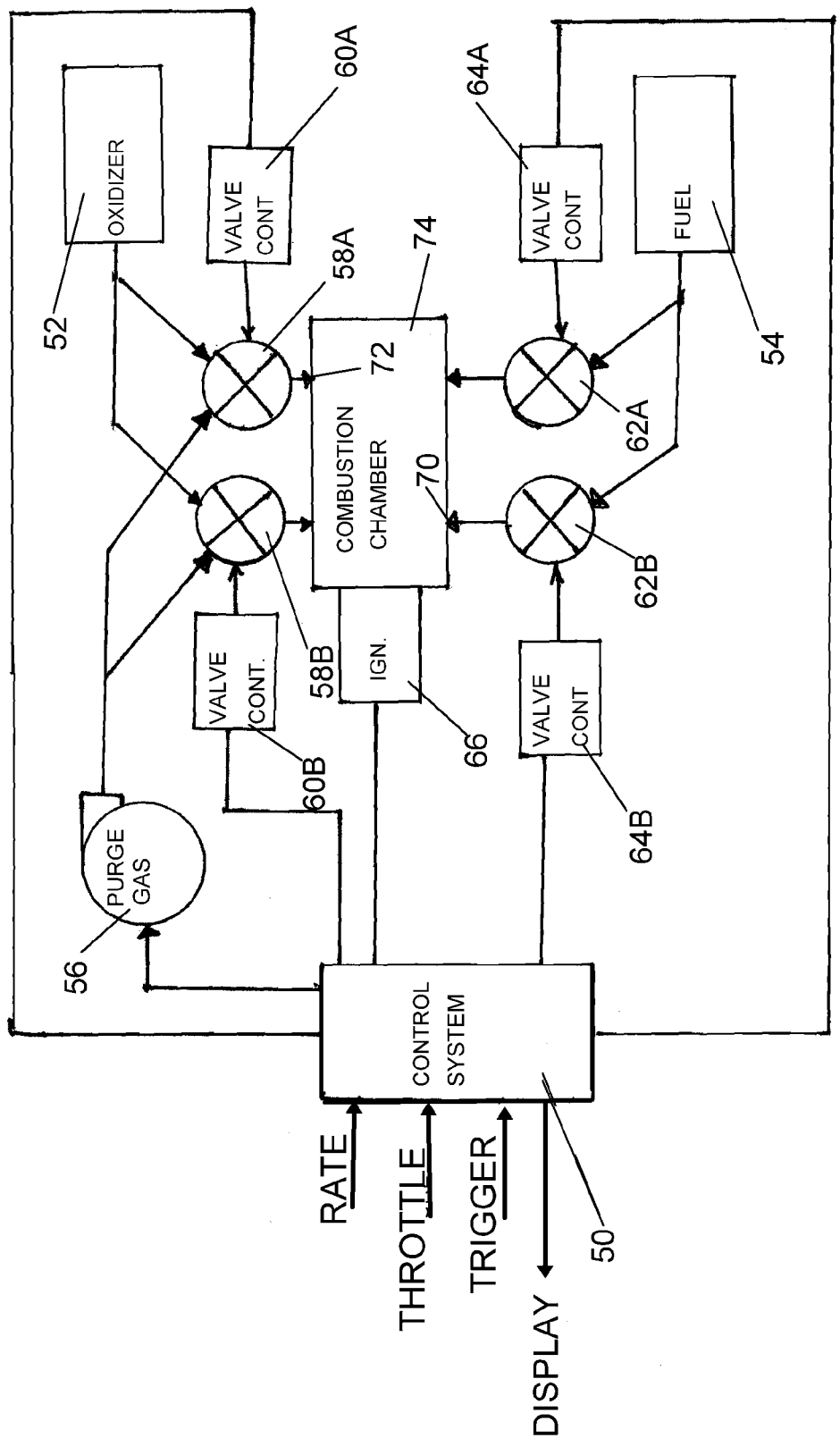
FIG. 9 is a high level depiction of the fuel and oxidizer injection system.

Referring to FIG. 9 a schematic for a pulse detonation engine 11 for vortex cannon 10 is illustrated. Pulse detonation engine 11 includes an electronic control system 50 which provides controls through which it receives inputs from an operator. Operator inputs include a throttle setting, a pulse rate setting and a trigger. The trigger can be manually cycled for single shots or held down for repeated firing. Control system 50 translates the operator inputs into control signals applied to various valve controllers and to an ignition source 66. Control system 50 may also be adapted to provide feedback information to the operator relating to vortex cannon 10 such as oxidizer pressure level, fuel pressure level, power source (battery) state of charge, on/off ready status and an overheating alarm. The throttle setting and pulse rate may be dialed in or otherwise set using a manual actuator the position of which indicates its setting.

Cycling rates of the ignition control signal and valve controller control signals set the rate of fire for repeated firing. In chronological order a cycle comprises setting a target fuel fill rate and mixture, injecting oxygen and fuel at predetermined rates, purging the fuel port 70/injection rail with a short shot of air or inert gas, trigger the ignition system and at high rates of fire again purge the port and rail. The duration of valve controller control signals can be used to control metering valve open duration to set detonation strength. Valve duration may increase as oxidizer and fuel pressure decline to maintain detonation strength although more precise results are obtained by use of pressure regulators fitted to the oxidizer and fuel sources 52, 54. In addition, control system 50 can automatically scale back detonation power in order to achieve the highest rates of fire. Electronic control system 50 generates the control signals for application to appropriate valves, purge gas compressor 56 and ignition source 66 to implement operator requests.

Control system 50 coordinates delivery of oxidizer and fuel to combustion chamber 74 by application of control signals to open valve controllers 58A-B for the delivery of oxidizer and valve controllers 62A-B for the delivery of fuel. Control system 50 activates an ignition source 66 to detonate the mixed oxidizer and fuel in combustion chamber. The quantity of oxidizer and fuel are controllable as a function of time valves 58A-B and 62A-B are open and whether one or both of metering valves 58A-B and 62A-B are used. The pressure at which oxidizer and fuel are delivered from oxidizer source 52 and fuel source 54 can affect the result if not pressure regulated. The control system 50 can be programmed to compensate for decreasing system pressure automatically by extending open periods, though this may entail decreasing rates of repeat firing or reduced detonation strength. Introducing purge gas from a compressor 56 (or other source) through the oxidizer inlet ports 72 is intended to prevent flash back through valves 58A-B and to cool the combustion chamber 74 to prevent auto-ignition of fuel in subsequent cycles of the system. Purge cycles are provided between ignition events and cycling of the oxidizer and fuel from off to on and on to off during repetition fire. In other words, during repetition fire oxidizer is never introduced to the combustion chamber 74 after a detonation event without first purging the inlet ports 72 and ignition of a fuel/oxidizer mixture never occurs without first purging the inlet ports. Purge gas may not be needed however in a system which uses atmospheric oxygen as its oxidizer source. Purging is not generally provided for the fuel inlet ports 70 but may be done.

From FIG. 9 it may be seen that combustion chamber 74 is fed by two oxidizer inlet ports 72. Connected between and oxidizer source 52 and inlet ports 72 are metering valves 58A-B which are positioned by valve controllers (typically solenoids) 60A-B. Metering valves 58A-B are also connected to a purge gas source 56 (here a pump used to compress atmospheric gas). The metering valves may be closed, or used to connect oxidizer inlet ports to either the purge gas source 56 or the oxidizer source 52. Oxidizer source may include an outlet pressure regulator to assure that oxygen, if available, is delivered at a fixed pressure to the combustion chamber 74.

Combustion chamber 74 is also fed by two fuel inlet ports 70. Ports 70 are connectable to a fuel source 54 by metering valves 62A-B. Metering valves 62A-B may be closed or opened by valve controllers 64A-B. Fuel source 54 is typically a gas under pressure and incorporates a pressure regulator to assure that fuel is delivered to the combustion chamber 74 at a fixed pressure. Valve controllers 60A-B and 64A-B respond to control signals from control system 50. It should be clear that varying the ratio of the lengths of time metering valves 58A-B are open to transfer oxidizer to combustion chamber relative to the lengths of time metering valves 62A-B are open controls the "mixture" ratio of oxidizer to fuel while the total length of time metering valves are open to deliver fuel and oxidizer can be used to control intensity. A "rich" mixture may be used to prevent detonation from occurring and instead initiating a deflagration process, if for some reason desired. A stoichiometric mixture which has substantially fully displaced the ambient atmosphere is a prerequisite condition of producing maximum detonation power.

Control system 50 provides control signals to a purge gas generator 56 (for example drive signals to a compressor motor for a compressor drawing ambient air), valve controllers 60A-B and 62A-B (for example solenoids) and to an ignition source 66 (for example a trigger for a spark plug). Control outputs are generated by the control system 50 in response to the operator inputs. In general, in response to a firing request the oxidizer metering valves 58A-B are opened synchronously with the fuel metering valves 62A-B to charge the combustion chamber 74 for a detonation event. After a brief delay to allow adequate mixing without excessive leakage a spark is generated to set off a detonation event. Additional operations of the oxidizer metering valves 58A-B may be provided to insert purge gas through the oxidizer inlets 72 to prevent combustion from entering the inlets. Purge gas may also be inserted to the combustion chamber 74 to cool the chamber after a detonation event to prevent auto-ignition of a detonation event for the next cycle. The need for this may depend on the firing rate. Inherent mechanical limitations in solenoids and valves limit the frequency, however, where a plurality of oxidizer metering valves 58A-B and fuel metering valves 62A-B are provided, their operation may be staggered to increase the frequency. Staggering the operation of the valves however results in an incremental reduction in the impulse power.

At constant pressure from the oxidizer source 52 and the fuel source 54, the absolute time duration in which metering valves 58A-B and 62A-B are open relates positively to the power released by subsequent detonation of a fuel/oxidizer charge. There is a limit to detonation power fixed by point where leakage of fuel and oxidizer from the combustion chamber equals the rate at which it can be delivered, allowing for time to close the metering valves and to purge the oxidizer inlets 72. Normally a stoichiometric mix is used at any power (throttle) setting, although a fuel rich mixture may be used to provide to soften the shock wave resulting from the detonation. By soften it is meant that the peak pressure of the resulting N wave is lower than for a stoichiometric ration and the time duration is longer. Metering valve relative timing may also be varied where reduced or increased power detonations are being produced, where oxygen is present in the purge gas.

Figure 10:
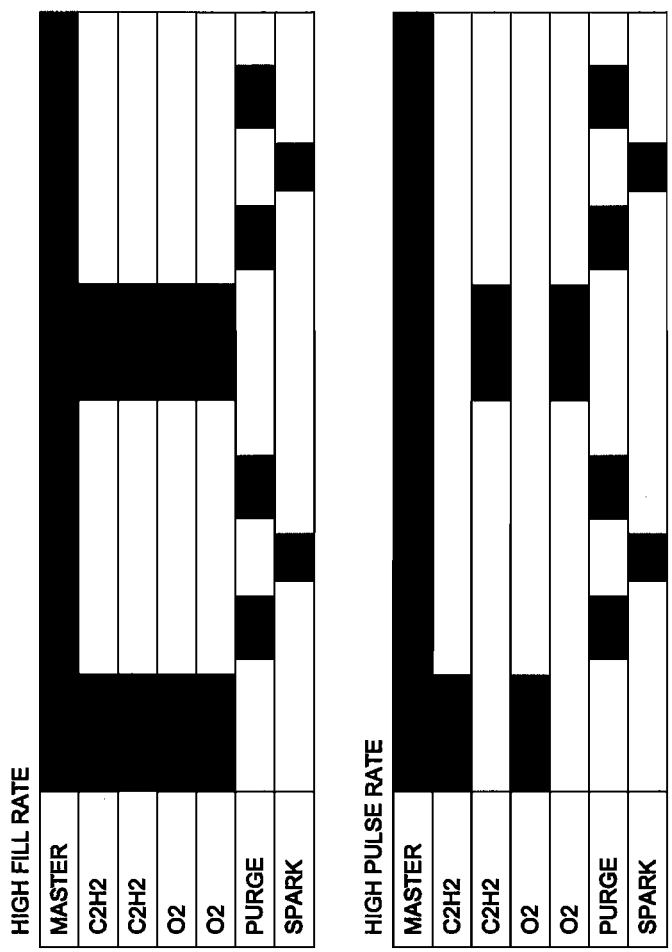
FIG. 10 is a timing diagram relating to charging, purging and igniting the combustion chamber for a pulse detonation engine.

FIG. 10 illustrates coordination of metering valve and spark timing for a high fill rate (to achieve maximum power) and a high pulse rate (obtained by staggered operation of metering valves to overcome inherent metering valve limitations and control overheating. The timing diagram assumes two oxidizer metering valves 58A-B and two fuel metering valves 62A-B all of which open synchronously for high fill rate firing. In order to obtain a high pulse rate alternate pairs of oxidizer metering valves and fuel metering valves open in conjunction with one another. The high pulse rate diagram reflects approximately half the elapsed time represented by the high fill rate diagram, however this difference is not reflected in the relative lengths of the on cycles (shown as the dark sections. Purge cycles occur just before and after spark generation.

Figure 11:
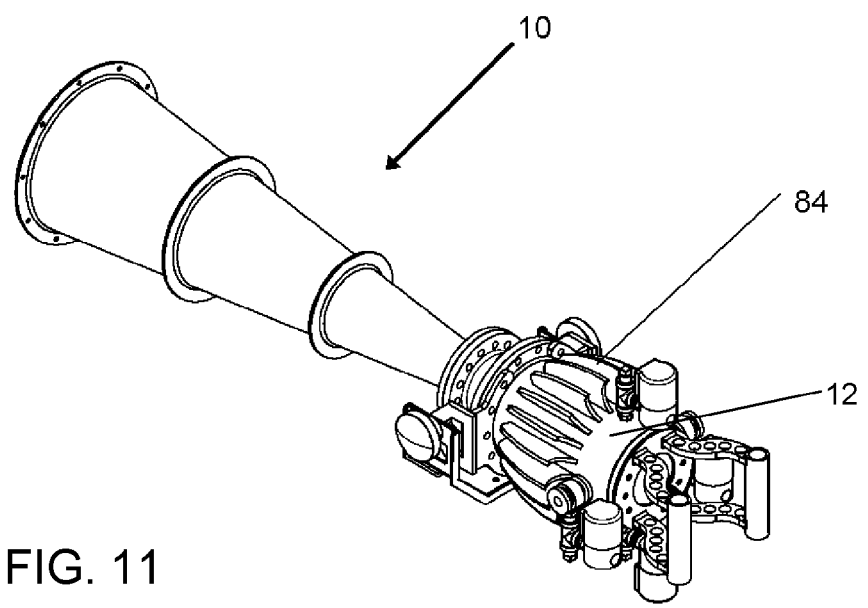
FIG. 11 is a perspective view of modified a pulse detonation engine and radial vortex generator.

FIG. 11 illustrates modification of vortex cannon 10 of FIG. 1 to include a plurality of cooling vanes 84 which are radially oriented outwardly from and distributed around the circumference of the combustion chamber housing 12. Cooling vanes 84 promote heat rejection from the combustion chamber 74 allowing increased rates of firing.

Figure 12:
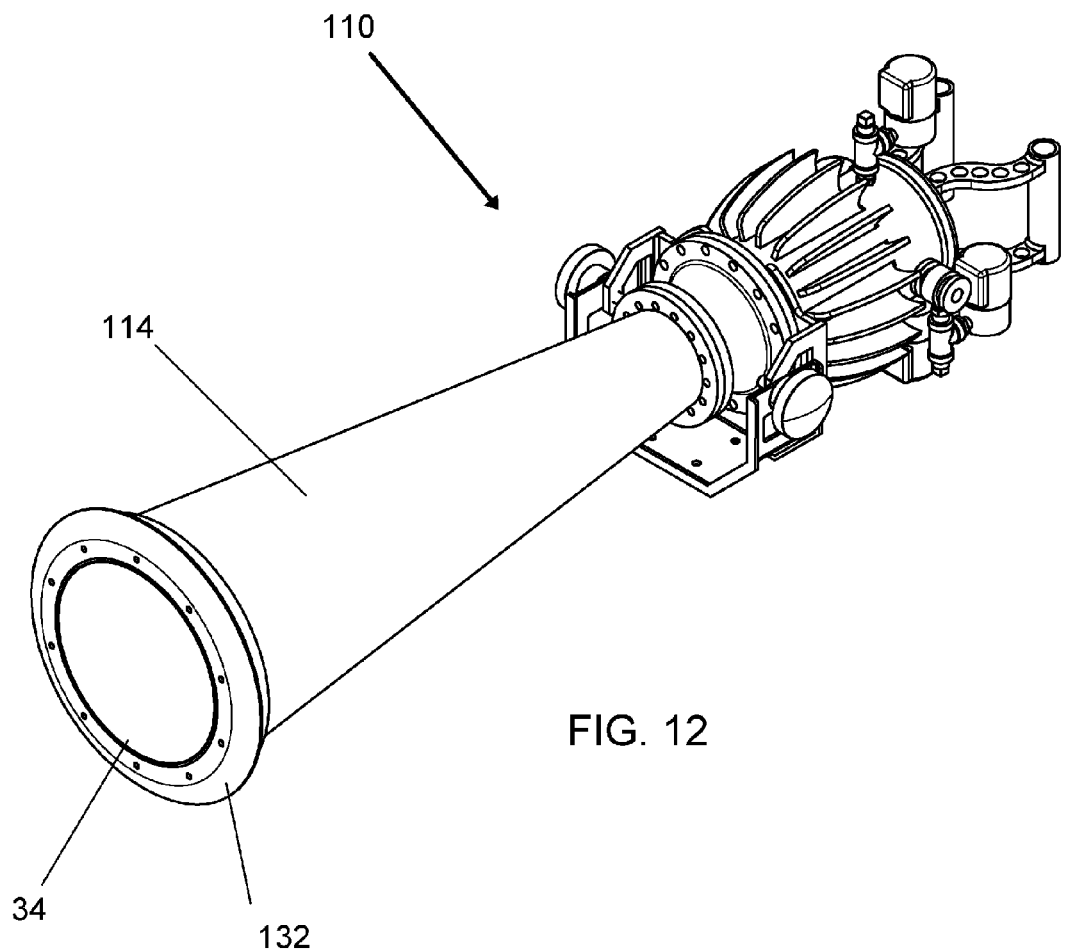
FIG. 12 is a perspective view of another embodiment of a pulse detonation engine and radial vortex generator.

FIG. 12 illustrates a vortex cannon 110 having a double bell 114 and an extended, reverse tapered muzzle facing 132 surrounding the muzzle 34. Vortex cannon 110 includes modifications to enhance vortex generation from the muzzle 34.

Figure 14:
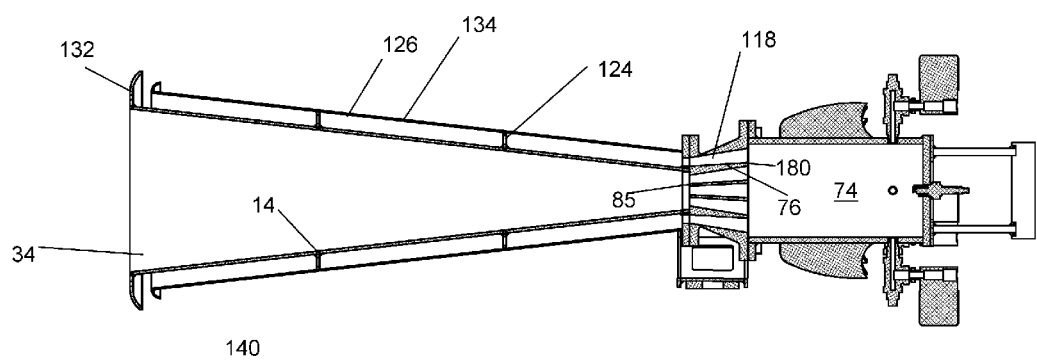
FIG. 14 is a top view of the pulse detonation engine and radial vortex generator of FIGS. 12 and 13.
Figure 13:
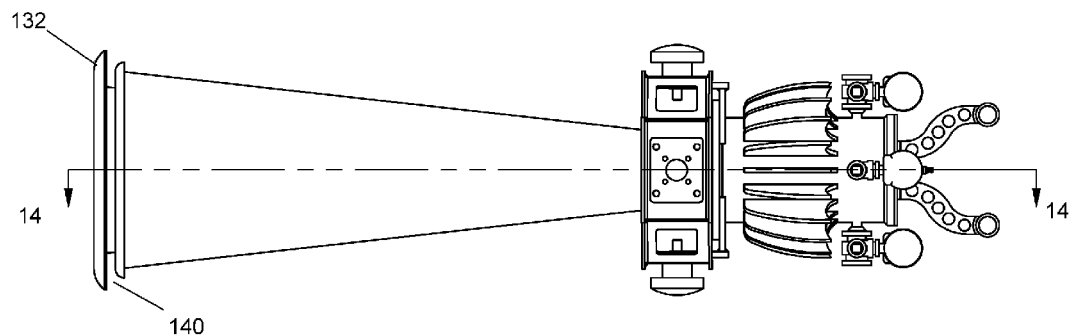
FIG. 13 is a cross-sectional view of the pulse detonation engine and radial vortex generator of FIG. 12.

FIG. 13 illustrates a secondary annular mouth 140 located behind muzzle facing 132 relative to the muzzle 34. Gas ejected from annular mouth 140 is directed primarily radially outwardly from the centerline of vortex cannon 110 and is partially reversed with respect to the direction of ejection of gas from muzzle 34. Since mouth 140 is outside of muzzle 34 gas ejected from the mouth 140 can promote vortex generation at the tapered facing 132. As shown in FIG. 14 an annular throat 118 from combustion chamber 74 into an expanding secondary pulse guide 126 allows for diversion of a portion of the combustion byproduct to annular mouth 140. Annular secondary pulse guide 126 is defined between bell 14 and outer bell casing 134 of the double bell 114. Reinforcement rings 124 are modified from reinforcement rings 16 by the location of ports through the rings. Annular throat 118 surrounds compression throat 76, which may or may not retain a compression plug 85. A divider 180 separates the annular throat 180 from the central compression throat 76.

What is claimed is:

1. An acoustically efficient vortex cannon comprising:
   a combustion chamber;
   a fuel source;
   an oxidizer source;
   a purge gas source;
   at least one valve for delivery of fuel from the fuel source to the combustion chamber;
   at least one valve for delivery of either oxidizer or purge gas from the oxidizer and purge gas sources to the combustion chamber;
   an ignition source for the combustion chamber for initiating detonation of fuel and oxidizer;
   an outlet from the combustion chamber;
   a conical pulse guide coupled to said outlet;
   a secondary pulse guide spaced radially outside of said conical pulse guide, said secondary pulse guide substantially surrounding an outer surface of said conical pulse guide; and
   a throat directly coupled to the outlet of the combustion chamber and an inlet of the conical pulse guide, wherein said conical pulse guide has a muzzle, the conical pulse guide being fluidically coupled to the outlet from the combustion chamber, said secondary pulse guide also being fluidically coupled to the outlet from the combustion chamber; and
   a mouth from the secondary pulse guide located radially outside the muzzle and oriented to elect gas radially outwardly from a center line through the muzzle.

2. The acoustically efficient vortex cannon as claimed in claim 1, wherein the at least one valve for delivery of fuel is a plurality of valves connecting the fuel source to the combustion chamber, the at least one valve for delivery of either oxidizer or purge gas includes a plurality of valves connecting the oxidizer source to the combustion chamber, the fuel and oxidizer valves being independently actuatable.

3. The acoustically efficient vortex cannon as claimed in claim 2, further comprising: a cylindrical wall forming part of the combustion chamber; a combustion chamber head closing one end of the cylindrical wall; and the pluralities of valves connecting the oxidizer source and the fuel source to the combustion chamber being arranged radially through said cylindrical combustion chamber wall and located substantially adjacent the combustion chamber head.

4. The acoustically efficient vortex cannon as claimed in claim 3, further comprising: a triggering control system providing for operating the pluralities of valves connecting the fuel source and the oxidizer source to the combustion chamber concurrently for increasing detonation intensity and the triggering control system further providing for staggered operation of sets of valves connecting the fuel source and the oxidizer source to the combustion chamber for reducing detonation intensity while allowing increased firing frequency.

5. The acoustically efficient vortex cannon as claimed in claim 3, further comprising: a triggering control system including a fuel and oxidizer mixing map and spark map allowing operator control over ignition frequency.

6. The acoustically efficient vortex cannon as claimed in claim 1, wherein the conical pulse guide having has a length tuned to propagation of a detonation front through the combustion chamber.

7. The acoustically efficient vortex cannon as claimed in claim 6, further comprising: the mouth located around the muzzle, said mouth being annular and at an end of said secondary pulse guide.

8. The acoustically efficient vortex cannon as claimed in claim 1, wherein said secondary pulse guide is located a generally uniform distance outside of the conical pulse guide.

9. A pulse detonation engine having high acoustical efficiency, comprising:
 a combustion chamber;
 a fuel source;
 an oxidizer source;
 a valve system metering delivery of fuel from the fuel source to the combustion chamber;
 a valve system for metering delivery of oxidizer from the oxidizer source to the combustion chamber;
 an ignition source for the combustion chamber for initiating detonation of fuel and oxidizer;
 an outlet from the combustion chamber;
 a conical pulse guide coupled to said outlet;
 a secondary pulse guide spaced radially outside of said conical pulse guide, said secondary pulse guide substantially surrounding an outer surface of said conical pulse guide;
 a throat directly coupled to the outlet of the combustion chamber and an inlet of the conical pulse guide, wherein said conical pulse guide has a muzzle, the conical pulse guide being fluidically coupled to the outlet from the combustion chamber, said secondary pulse guide also being fluidically coupled to the outlet from the combustion chamber; and
 a mouth from the secondary pulse guide located radially outside the muzzle and oriented to elect gas radially outwardly from a center line through the muzzle; and
 a control system responsive to operator inputs for generating control signals to deliver oxidizer and fuel to the combustion chamber for an isolated or for repeating detonations, the control system being further responsive to operator inputs for varying the strength of detonations and the frequency of detonations.

10. The pulse detonation engine as claimed in claim 9, wherein said conical pulse guide has a radial shear former located around the muzzle.

11. The pulse detonation engine as claimed in claim 9, the control system being further responsive to operator inputs for varying shock wave intensity through control over the fuel to oxidizer mixture ratio.

12. The pulse detonation engine as claimed in claim 9, further comprising: a purge gas source connected to the oxidizer valve system; and the control system being further adapted to insert purge gas to the combustion chamber for effectively clearing inlet ports from the oxidizer valve system to the combustion chamber of oxidizer and to cool the combustion chamber between detonation events.

13. The pulse detonation engine as claimed in claim 12, wherein compressed air is used as the purge gas.

14. The pulse detonation engine as claimed in claim 11, further comprising: the control system being further adapted to stagger operation of metering valves for oxidizer and fuel to increase the frequency of detonations.

* * * * *